United States Patent
Hillier et al.

(10) Patent No.: US 12,536,267 B2
(45) Date of Patent: Jan. 27, 2026

(54) SYSTEM FOR IMPLEMENTING MUTABLE DEVICE OWNERSHIP TRANSFER (DOT) OF A DEVICE

(71) Applicant: NVIDIA CORPORATION, Santa Clara, CA (US)

(72) Inventors: Christopher Anthony Grant Hillier, Fort Collins, CO (US); Raghupathy Krishnamurthy, San Jose, CA (US); Varun Sampath, Santa Clara, CA (US); Mayur Vivek Gudmeti, Durham, NC (US)

(73) Assignee: Nvidia Corporation, Santa Clara, CA (US)

( * ) Notice: Subject to any disclaimer, the term of this patent is extended or adjusted under 35 U.S.C. 154(b) by 198 days.

(21) Appl. No.: 18/111,799

(22) Filed: Feb. 20, 2023

(65) Prior Publication Data
US 2024/0281514 A1 Aug. 22, 2024

(51) Int. Cl.
*G06F 21/00* (2013.01)
*G06F 21/44* (2013.01)
*H04L 9/30* (2006.01)

(52) U.S. Cl.
CPC .............. *G06F 21/44* (2013.01); *H04L 9/30* (2013.01)

(58) Field of Classification Search
None
See application file for complete search history.

(56) References Cited

U.S. PATENT DOCUMENTS

| | | | |
|---|---|---|---|
| 11,831,406 B2* | 11/2023 | Egranov | H04L 9/0825 |
| 12,069,169 B2* | 8/2024 | Luciani, Jr. | H04L 9/0894 |
| 2019/0014117 A1* | 1/2019 | Li | H04L 67/14 |
| 2022/0029831 A1* | 1/2022 | Baek | G16Y 10/75 |
| 2022/0060313 A1* | 2/2022 | Egranov | H04L 9/3247 |
| 2023/0010345 A1* | 1/2023 | Khatri | G09C 1/00 |

(Continued)

FOREIGN PATENT DOCUMENTS

EP 4386602 A1 * 6/2024 ............. G06F 21/57

OTHER PUBLICATIONS

Palmer, Elaine et al., "Ownership and Control of Firmware in Open Compute Project Devices", IBM Research Division, retrieved from https://www.opencompute.org/documents/ibm-white-paper-ownership-and-control-of-firmware-in-open-compute-project-devices, Nov. 9, 2018, 8 pages.

(Continued)

*Primary Examiner* — Jeffery L Williams
(74) *Attorney, Agent, or Firm* — Michele M. Glessner; Moore & Van Allen PLLC

(57) ABSTRACT

Systems and methods are described herein for implementing a mutable device ownership transfer (DOT) of a device. An example system receives a request from a first customer to record a mutable DOT of a device using a First Customer Authentication Key (FCAK); receives the FCAK from the first customer in response to receiving the request; determines whether the device is capable of recording the mutable DOT; and installs, using a DOT circuitry, the FCAK in a non-volatile memory of a Root of Trust (RoT) associated with the device in an instance in which the device is capable of recording the mutable DOT. Installing the FCAK in the non-volatile memory of the Root of Trust (RoT) results in no permanent modification to the device.

16 Claims, 4 Drawing Sheets

(56) References Cited

U.S. PATENT DOCUMENTS

| | | | | |
|---|---|---|---|---|
| 2023/0018085 A1* | 1/2023 | Khatri | ............... | H04L 9/0897 |
| 2023/0229778 A1* | 7/2023 | Terpstra | ............... | G06F 21/73 |
| | | | | 713/2 |
| 2023/0246827 A1* | 8/2023 | Luciani, Jr. | ........... | G06F 9/4401 |
| | | | | 713/189 |
| 2024/0281514 A1* | 8/2024 | Hillier | ............... | G06F 21/44 |

OTHER PUBLICATIONS

"Ownership Transfer", retrieved from https://docs.google.com/document/d/1oANhjvv_R7E5n8w1RroN8I8-0jdYlfdQDp_3RqGV66k/edit#heading=h.pdkwdxyrhnco, dated Sep. 28, 2021, 15 pages.

Egranov, Daniil et al., "System Ownership and Firmware with Multiple Signing Domains", retrieved from https://drive.google.com/file/d/1hVj0qxCsZGg3ZXR70asCPRKz8eBRDC13/view, dated Aug. 22, 13 pages.

"OCP Security meeting notes", retrieved from https://docs.google.com/document/d/1VVMUzYESZNuyT1_YJIQSdSKBy-5t1otJlyXTbXuOoX4/edit#/bookmark=kix.sbh4tabk0z61, dated Jan. 25, 2022, 50 pages.

* cited by examiner

SYSTEM FOR IMPLEMENTING MUTABLE DEVICE OWNERSHIP TRANSFER (DOT) OF A DEVICE

TECHNOLOGICAL FIELD

Example embodiments of the present disclosure relate to device ownership and, more particularly, to a mutable implementation of device ownership transfer (DOT) of a device.

BACKGROUND

Existing solutions for a customer to take ownership of a device require a customer authentication key (CAK) to be recorded in electrical fuses of the device or otherwise require permanent modification of the circuitry of the device. Such modifications often cause internal issues related to device architecture, compounding complexities and raising associated costs.

Applicant has identified a number of deficiencies and problems associated with device ownership transfer (DOT) of a device. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for implementing mutable device ownership transfer (DOT) of a device.

In one aspect, a system for implementing mutable Device Ownership Transfer (DOT) of a device is presented. The system comprising: Device Ownership Transfer (DOT) circuitry; and a processor operatively coupled to the DOT circuitry, wherein the processor is configured to: receive a request from a first customer to record a mutable DOT of a device using a First Customer Authentication Key (FCAK); receive the FCAK from the first customer in response to receiving the request; determine whether the device is capable of recording the mutable DOT; and install, using the DOT circuitry, the FCAK in a non-volatile memory of a Root of Trust (RoT) associated with the device in an instance in which the device is capable of recording the mutable DOT, wherein installing the FCAK in the non-volatile memory of the Root of Trust (RoT) results in no permanent modification to the device.

In some embodiments, the processor is configured to: initially install the FCAK in a volatile memory of the RoT associated with the device in an instance in which the device is capable of recording the mutable DOT; transfer the FCAK from the volatile memory of the RoT associated with the device to the non-volatile memory of the RoT associated with the device; and mutably lock the FCAK using a public portion of a First Lock Authentication Key (FLAK) in the non-volatile memory of the RoT associated with the device to prevent additional CAK installation, wherein the public portion of the FLAK is associated with the first customer.

In some embodiments, the processor is configured to: receive a first authenticated unlock request associated with the device to replace the FCAK with a Second Customer Authentication Key (SCAK), wherein the SCAK is associated with the first customer; unlock the device in response to receiving the first authenticated unlock request; transfer the FCAK from the non-volatile memory of the RoT associated with the device to the volatile memory of the RoT associated with the device, thereby allowing for deletion of the FCAK upon a subsequent device reset; install, using the DOT circuitry, the SCAK in the non-volatile memory of the RoT associated with the device; and mutably lock the SCAK using the public portion of the FLAK in the non-volatile memory of the RoT associated with the device to prevent additional CAK installation.

In some embodiments, in unlocking the device, the processor is configured to: retrieve a private portion of the FLAK from the first authenticated unlock request to unlock access to the FCAK; and unlock, using the private portion of the FLAK, access to the FCAK installed in the non-volatile memory of the RoT associated with the device.

In some embodiments, the processor is configured to: receive a second authenticated unlock request associated with the device to transfer ownership of the device from the first customer to a second customer by replacing the FCAK with a Third Customer Authentication Key (TCAK), wherein the TCAK is associated with the second customer; unlock the device in response to receiving the second authenticated unlock request; transfer the FCAK from the non-volatile memory of the RoT associated with the device to the volatile memory of the RoT associated with the device, thereby allowing for deletion of the FCAK upon a subsequent device reset; install, using the DOT circuitry, the TCAK in the non-volatile memory of the RoT associated with the device, thereby transferring ownership of the device to the second customer, wherein installing the TCAK in the non-volatile memory of the RoT results in no permanent modification to the device; and mutably lock the TCAK using a public portion of a Second Lock Authentication Key (SLAK) in the non-volatile memory of the RoT associated with the device to prevent additional CAK installation, wherein the public portion of the SLAK is associated with the second customer.

In some embodiments, the FCAK is a public key associated with the first customer that is used for firmware signature authentication.

In some embodiments, the processor is configured to: trigger a firmware update on the device; receive a firmware image associated with the firmware update; authenticate the firmware image using the FCAK installed in the non-volatile memory of RoT associated with the device; and authorize installation of the firmware update on the device in an instance in which the firmware image is authenticated.

In some embodiments, the FCAK is preserved when the device is rebooted.

In another aspect, a method for implementing mutable Device Ownership Transfer (DOT) of a device is presented. The method comprising: receiving a request from a first customer to record a mutable DOT of a device using a First Customer Authentication Key (FCAK); receiving the FCAK from the first customer in response to receiving the request; determining whether the device is capable of recording the mutable DOT; and installing, using a DOT circuitry, the FCAK in a non-volatile memory of a Root of Trust (RoT) associated with the device in an instance in which the device is capable of recording the mutable DOT, wherein installing the FCAK in the non-volatile memory of the Root of Trust (RoT) results in no permanent modification to the device.

In yet another aspect, a system for implementing volatile Device Ownership Transfer (DOT) of a device is presented. The system comprising: Device Ownership Transfer (DOT) circuitry; and a processor operatively coupled to the DOT circuitry, wherein the processor is configured to: receive a request from a first customer to record a volatile DOT of a device using a First Customer Authentication Key (FCAK);

receive the FCAK from the first customer in response to receiving the request; and install, using the DOT circuitry, the FCAK in a volatile memory of a Root of Trust (RoT) associated with the device, wherein installing the FCAK in the volatile memory of the RoT results in no permanent modification to the device.

In some embodiments, the processor is configured to: receive an indication that the device has been rebooted resulting in a deletion of the FCAK in the volatile memory; and automatically install, using the DOT circuitry, the FCAK in the volatile memory in response to receiving the indication that the device has been rebooted.

In some embodiments, the processor is configured to: receive a stimulus to securely reboot the device; determine whether the FCAK is installed in the volatile memory of the RoT associated the device in response to receiving the stimulus; and trigger the device to securely reboot in an instance where the FCAK is installed in the volatile memory of the RoT associated with the device.

In some embodiments, the processor is configured to: deny the device to securely reboot in an instance where the FCAK is not installed in the volatile memory of the RoT associated with the device.

In yet another aspect, a method for implementing volatile Device Ownership Transfer (DOT) of a device is presented. The method comprising: receiving a request from a first customer to record a volatile DOT of a device using a First Customer Authentication Key (FCAK); receiving the FCAK from the first customer in response to receiving the request; and installing, using a DOT circuitry, the FCAK in a volatile memory of a Root of Trust (RoT) associated with the device, wherein installing the FCAK in the volatile memory of the RoT results in no permanent modification to the device.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
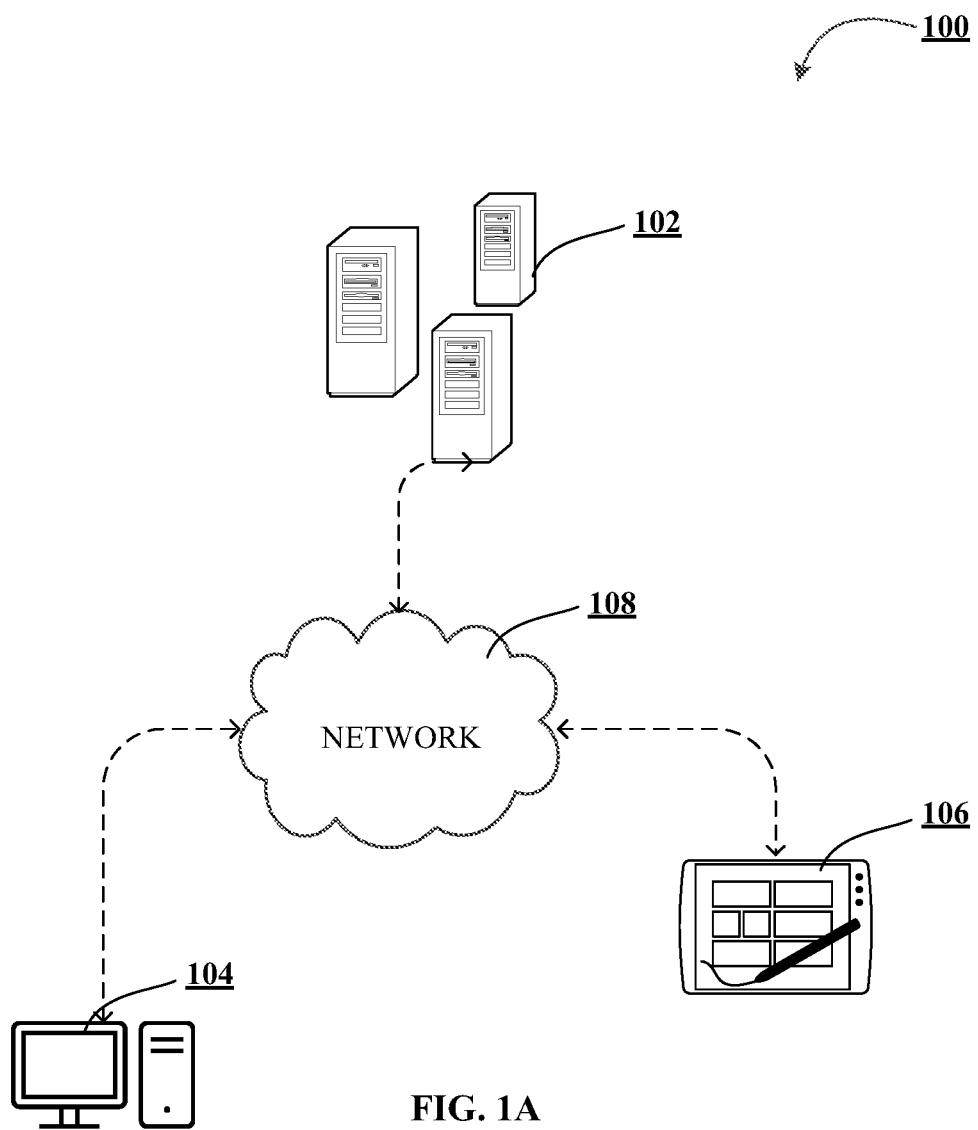
Figure 1B:
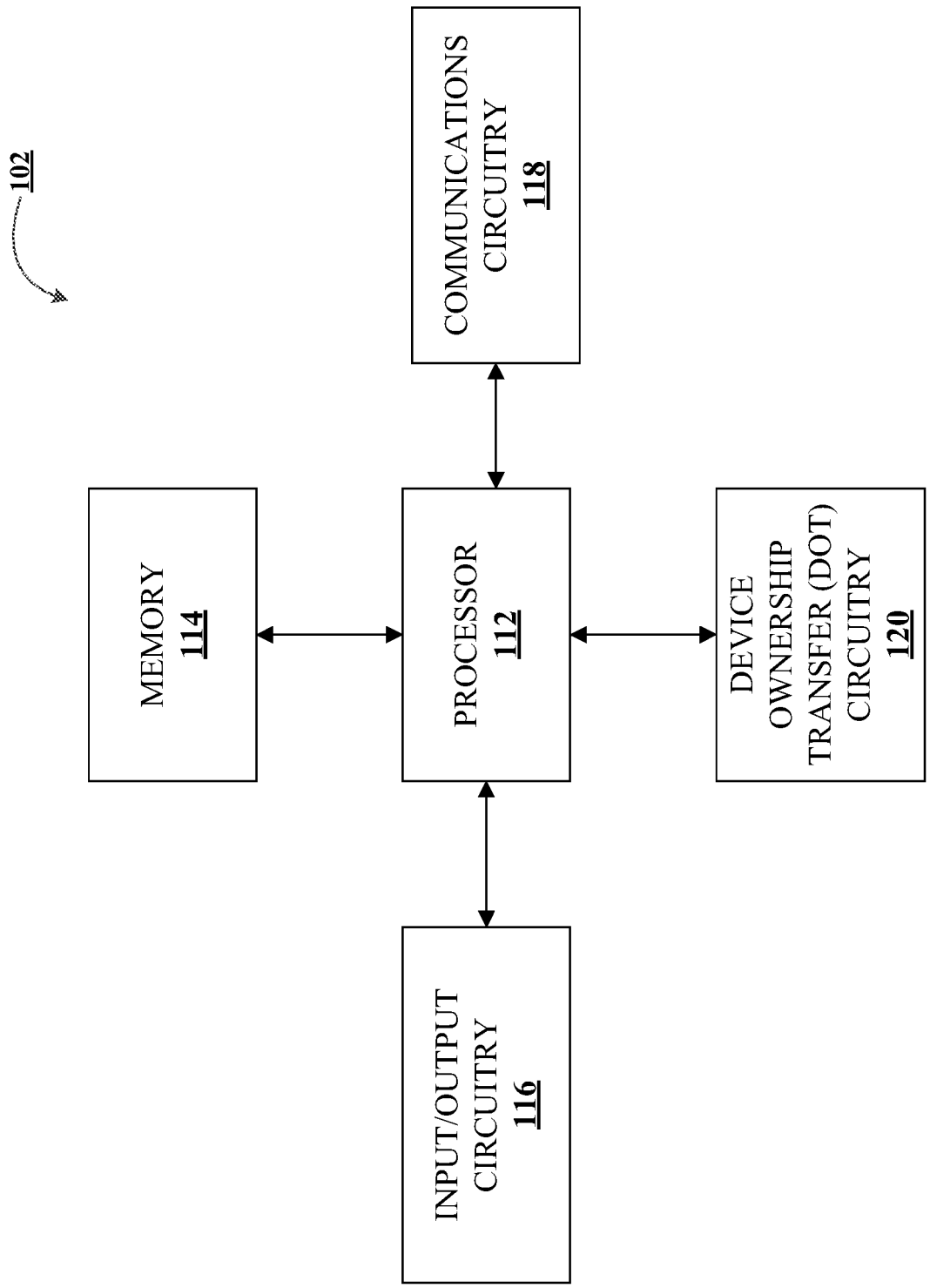
Figure 2:
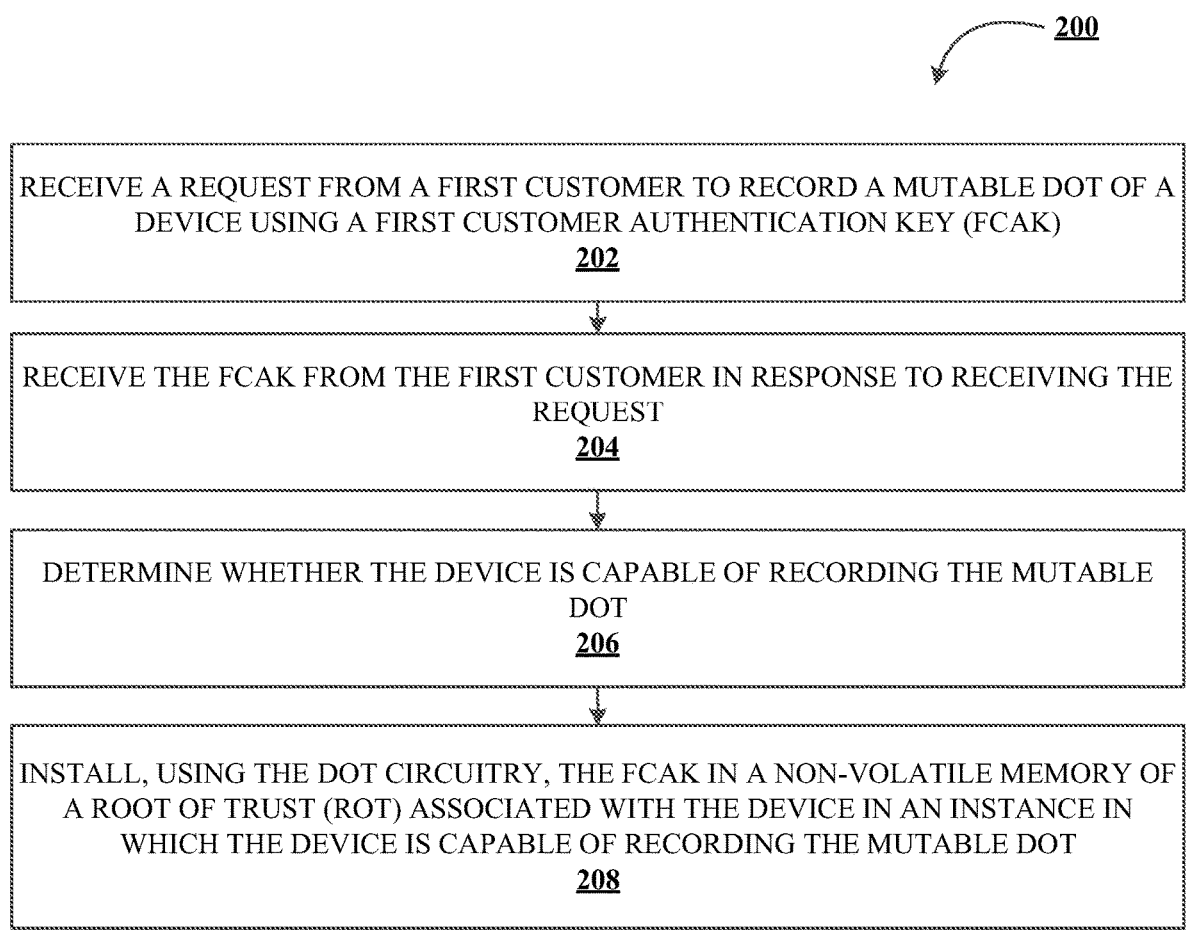
Figure 3:
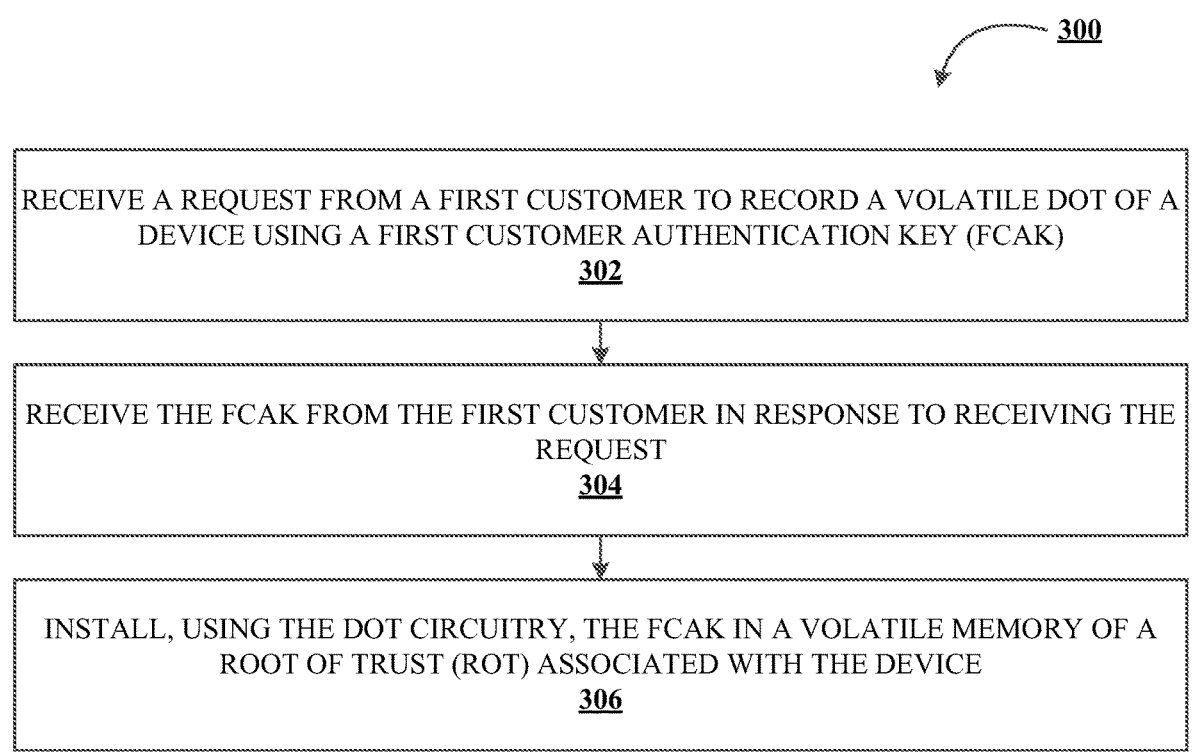

FIG. 1A illustrates an example network environment for implementing mutable device ownership transfer (DOT) of a device, in accordance with an embodiment of the present disclosure;

FIG. 1B illustrates an example block diagram of a system for use with various embodiments of the present disclosure;

FIG. 2 illustrates an example method for implementing volatile DOT of a device, in accordance with an embodiment of the present disclosure; and FIG. 3 illustrates an example method for implementing non-volatile DOT of a device, in accordance with an embodiment of the present disclosure.

DETAILED DESCRIPTION

Overview

When a new device is adopted by a customer for integration into an existing computing environment, the customer may wish to take ownership of the device as a measure of protection from unauthorized use. Existing solutions for a customer to take ownership of a device require a customer authentication key (CAK) to be recorded in electrical fuses of the device or otherwise require permanent modification of the circuitry of the device. Such modifications often cause internal issues related to device architecture, compounding complexities and raising associated costs. Therefore, there is a need for a mechanism by which a customer may take device ownership without causing any permanent modification to the device itself.

Embodiments of the present invention describe a mechanism by which a customer may take ownership of a device (e.g., a central processing unit (CPU), graphics processing unit (GPU), or the like) by installing a customer owned CAK in the Root of Trust (RoT) of the device. To this end, embodiments of the invention may determine that the device is capable of recording the CAK (e.g., no CAK is currently installed). The CAK may be a public key associated with the customer that is used for software signature authentication. For example, any update to the firmware of the device may require the specific firmware update to be signed by the CAK prior to being authorized for installation. In addition, the CAK may be used to authenticate any subsequent reboot sequence associated with the device.

In an example embodiment, the CAK may be mutably installed in a non-volatile memory of the RoT associated with the device and subsequently locked therein using a public portion of a Lock Authentication Key (LAK). Here, the CAK is initially installed in a volatile memory of the RoT of the device. To mutably lock the CAK, the CAK is transferred from the volatile memory to the non-volatile memory, where it is locked to prevent additional CAK installations. In some cases, the customer may wish to rotate CAKs by retiring the CAK installed in the non-volatile memory and replacing it with a new CAK. To achieve this, the customer may be required to unlock the CAK that is currently installed in the device. To unlock the CAK, the customer may be required to present the requisite authentication credentials (e.g., proof of ownership of a corresponding private portion of the LAK). Once unlocked, the customer may retire the existing CAK by moving the CAK from the non-volatile memory to the volatile memory and may subsequently install the new CAK in the device. In some other cases, the customer may wish to transfer ownership of the device to a second customer by retiring the CAK installed in the non-volatile memory and replacing it with a CAK owned by the second customer. Similar to the CAK rotation process, the customer may be required to present the requisite authentication credentials to unlock the CAK and may subsequently retire the existing CAK, such as by moving the CAK to the volatile memory. The CAK owned by the second customer may then be installed in the device and locked. In both cases, the retired CAK now stored in the volatile memory is erased upon a power cycle (e.g., device reboot).

In another example embodiment, the CAK may be installed in a volatile memory of the RoT of the device. Because the volatile memory is reset during a power cycle, the CAK must be streamed to the device upon every reset to ensure the CAK is available for usage during device secure reboot or software update (e.g., firmware update).

Embodiments of the present invention will now be described more fully hereinafter with reference to the accompanying drawings, in which some, but not all, embodiments are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, "operatively coupled" may mean that the components are electronically coupled and/or are in or are capable of electrical communication with one another, or optically coupled and/or are in or are capable of optical communication with one another. Furthermore, "operatively coupled" may mean that the components may be formed integrally with each other or may be formed separately and coupled together. Furthermore, "operatively coupled" may mean that the components may be directly connected to each other or may be connected to each other with one or more components (e.g., connectors) located between the components that are operatively coupled together. Furthermore, "operatively coupled" may mean that the components are detachable from each other or that they are permanently coupled together.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, satisfied, etc.

As used herein, "customer" may be any individual who wishes to take ownership of the device.

It should be understood that the word "exemplary" is used herein to mean "serving as an example, instance, or illustration." Any implementation described herein as "exemplary" is not necessarily to be construed as advantageous over other implementations.

Furthermore, as would be evident to one of ordinary skill in the art in light of the present disclosure, the terms "substantially" and "approximately" indicate that the referenced element or associated description is accurate to within applicable engineering tolerances.

Example Device Ownership Transfer (DOT) Systems

FIG. 1A illustrates an example network environment 100 for implementing mutable Device Ownership Transfer (DOT) of a device, in accordance with an embodiment of the present disclosure. As shown in FIG. 1A, the network environment 100 may include a system 102, a customer input device 104, and a device 106. It is to be understood that the structure of the network environment 100 and its components, connections and relationships, and their functions, are meant to be examples, only, and are not meant to limit implementations of the embodiments described and/or claimed in this document. In one example, the network environment 100 may include more, fewer, or different components. In another example, some or all of the portions of the network environment 100 may be combined into a single portion, or all of the portions of the network environment 100 may be separated into two or more distinct portions.

The system 102 may be implemented in a number of different forms. For example, the system 102 may be implemented as a standard server, or multiple times in a group of such servers. Additionally, the system 102 may also be implemented as part of a rack server system or a personal computer such as a laptop computer. Alternatively, components from the system 102 may be combined with one or more other same or similar systems and an entire system 102 may be made up of multiple computing devices communicating with each other. The system 102 may represent various forms of servers, such as web servers, database servers, file servers, or the like, various forms of digital computing devices, such as laptops, desktops, workstations, or the like, or any other auxiliary network devices, Internet-of-things devices, electronic kiosk devices, mainframes, or the like, or any combination of the aforementioned. In some examples, the system 102 may include, in whole or in part, the customer input device 104 and/or the customer input device 104 may include, in whole or in part, the system 102. The system 102 is described in greater detail below in connection with FIG. 1B.

With continued reference to FIG. 1A, the customer input device 104 may represent various forms of electronic devices, including customer input devices such as personal digital assistants, cellular telephones, smartphones, laptops, desktops, and/or the like, electronic telecommunications device, and/or edge devices such as routers, routing switches, integrated access devices (IAD), and/or the like. In some embodiments, a customer may use the customer input device 104 to transmit and/or receive information or commands to and from the system 102 via the network 108.

With continued reference to FIG. 1A, the device 106 may refer to any unit of physical hardware or equipment that provides computing functions. The device 106 may include software, including firmware such as a unified extensible firmware interface (UEFI), that provides a programmable operational environment with enhanced control, security, and manageability of the booting (or rebooting) process and boot-time applications and services. In example embodiments, the device 106 may refer to a single processor or a cluster of processors that are capable of providing high performance, power efficiency, and high-bandwidth connectivity that can be used in diverse configurations for different data center needs. As such, a device 106 may be a central processing unit (CPU) or a graphics processing unit (GPU) capable of processing massive amounts of data and performing complex calculations at high speeds. In some embodiments, the device 106 may include a Root of Trust (RoT). RoT may refer to a secure point of reference used to verify the authenticity and integrity of the device. A RoT may be implemented using highly reliable hardware, firmware, and software components to validate the authenticity of the device before any other operations and/or processes can be performed thereon. Encryption, signing, authentication, and authenticated key exchange are all cryptographic operations that rely on secret keys (e.g., CAKs) that must be kept secure and remain secret. A RoT is a vital component of any Public Key Infrastructure (PKI) and Symmetric Key Infrastructures to generate and protect such secret keys.

With continued reference to FIG. 1A, the network 108 may be a distributed network that is spread over different networks. This provides a single data communication network, which can be managed jointly or separately by each network. Besides shared communication within the network, the distributed network often also supports distributed processing. The network 108 may be a form of a digital communication network such as a telecommunication network, a local area network ("LAN"), a wide area network ("WAN"), a global area network ("GAN"), the Internet, or any combination of the foregoing. The network 108 may be secure and/or unsecure and may also include wireless and/or wired and/or optical interconnection technology.

Example System Circuitry

FIG. 1B illustrates an example block diagram of a system 102 for use with various embodiments of the present disclosure. As shown in FIG. 1B, the system 102 may include a processor 112, a memory 114, input/output circuitry 116, communications circuitry 118, and DOT circuitry 120.

Although the term "circuitry" as used herein with respect to components 112-120 is described in some cases using functional language, it should be understood that the particular implementations necessarily include the use of particular hardware configured to perform the functions associated with the respective circuitry as described herein. It should also be understood that certain of these components 112-120 may include similar or common hardware. For example, two sets of circuitries may both leverage the same processor, network interface, storage medium, or the like to perform their associated functions, such that duplicate hardware is not required for each set of circuitries.

While the term "circuitry" should be understood broadly to include hardware, in some embodiments, the term "circuitry" may also include software for configuring the hardware. For example, in some embodiments, "circuitry" may include processing circuitry, storage media, network interfaces, input/output devices, and the like. In some embodiments, other elements of the system 102 may provide or supplement the functionality of particular circuitry. For example, the processor 112 may provide processing functionality, the memory 114 may provide storage functionality, the communications circuitry 118 may provide network interface functionality, and the like.

In some embodiments, the processor 112 (and/or co-processor or any other processing circuitry assisting or otherwise associated with the processor) may be in communication with the memory 114 via a bus for passing information among components of, for example, the system 102. The memory 114 may be non-transitory and may include, for example, one or more volatile and/or non-volatile memories, or some combination thereof. In other words, for example, the memory 114 may be an electronic storage device (e.g., a non-transitory computer readable storage medium). The memory 114 may be configured to store information, data, content, applications, instructions, or the like, for enabling an apparatus, e.g., the system 102, to carry out various functions in accordance with example embodiments of the present disclosure.

Although illustrated in FIG. 1B as a single memory, the memory 114 may comprise a plurality of memory components. The plurality of memory components may be embodied on a single computing device or distributed across a plurality of computing devices. In various embodiments, the memory 114 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 114 may be configured to store information, data, applications, instructions, or the like for enabling the system 102 to carry out various functions in accordance with example embodiments discussed herein. For example, in at least some embodiments, the memory 114 is configured to buffer data for processing by the processor 112. Additionally, or alternatively, in at least some embodiments, the memory 114 is configured to store program instructions for execution by the processor 112. The memory 114 may store information in the form of static and/or dynamic information. This stored information may be stored and/or used by the system 102 during the course of performing its functionalities.

The processor 112 may be embodied in a number of different ways and may, for example, include one or more processing devices configured to perform independently. Additionally, or alternatively, the processor 112 may include one or more processors configured in tandem via a bus to enable independent execution of instructions, pipelining, and/or multithreading. The processor 112 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 1B as a single processor, in some embodiments, the processor 112 may include a plurality of processors. The plurality of processors may be embodied on a single computing device or may be distributed across a plurality of such devices collectively configured to function as the system 102. The plurality of processors may be in operative communication with each other and may be collectively configured to perform one or more functionalities of the system 102 as described herein.

In an example embodiment, the processor 112 is configured to execute instructions stored in the memory 114 or otherwise accessible to the processor 112. Alternatively or additionally, the processor 112 may be configured to execute hard-coded functionality. As such, whether configured by hardware or software methods, or by a combination thereof, the processor 112 may represent an entity (e.g., physically embodied in circuitry) capable of performing operations according to an embodiment of the present disclosure while configured accordingly. Alternatively, as another example, when the processor 112 is embodied as an executor of software instructions, the instructions may specifically configure the processor 112 to perform one or more algorithms and/or operations described herein when the instructions are executed. For example, these instructions, when executed by the processor 112, may cause the system 102 to perform one or more of the functionalities thereof as described herein.

In some embodiments, the system 102 further includes input/output circuitry 116 that may, in turn, be in communication with the processor 112 to provide an audible, visual, mechanical, or other output and/or, in some embodiments, to receive an indication of an input from a customer or another source. In that sense, the input/output circuitry 116 may include means for performing analog-to-digital and/or digital-to-analog data conversions. The input/output circuitry 116 may include support, for example, for a display, touchscreen, keyboard, mouse, image capturing device (e.g., a camera), microphone, and/or other input/output mechanisms. The input/output circuitry 116 may include a customer interface and may include a web customer interface, a mobile application, a kiosk, or the like.

The processor 112 and/or customer interface circuitry comprising the processor 112 may be configured to control one or more functions of a display or one or more customer interface elements through computer-program instructions (e.g., software and/or firmware) stored on a memory accessible to the processor 112 (e.g., the memory 114, and/or the like). In some embodiments, aspects of the input/output circuitry 116 may be reduced as compared to embodiments where the system 102 may be implemented as an end-customer machine or other type of device designed for complex customer interactions. In some embodiments (like other components discussed herein), the input/output circuitry 116 may be eliminated from the system 102. The input/output circuitry 116 may be in communication with the memory 114, communications circuitry 118, and/or any other component(s), such as via a bus. Although more than one input/output circuitry and/or other component can be included in the system 102, only one is shown in FIG. 1B to avoid overcomplicating the disclosure for ease of explanation (e.g., as with the other components discussed herein).

The communications circuitry 118, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with the device. In this regard, the communications circuitry 118 may include, for example, a network interface for enabling communications with a wired or wireless communication network. For example, in some embodiments, communications circuitry 118 may be configured to receive and/or transmit any data that may be stored by the memory 114 using any protocol that may be used for communications between computing devices. For example, the communications circuitry 118 may include one or more network interface cards, antennae, transmitters, receivers, buses, switches, routers, modems, and supporting hardware and/or software, and/or firmware/software, or any other device suitable for enabling communications via a network. Additionally, or alternatively, in some embodiments, the communications circuitry 118 may include circuitry for interacting with antenna(e) to cause transmission of signals via the antenna(e) or to handle receipt of signals received via the antenna(e). These signals may be transmitted by the system 102 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. The communications circuitry 118 may additionally or alternatively be in communication with the memory 114, the input/output circuitry 116, and/or any other component of system 102, such as via a bus. The communication circuitry 118 of the system 102 may also be configured to receive and transmit information with the various network ports discussed herein.

The DOT circuitry 120, in some embodiments, may be hardware, software, firmware, and/or a combination of such components that is configured to install customer authentication keys (CAKs) in the root of trust (RoT) of the device. In some embodiments, the DOT circuitry 120 may use the memory 114 to store information thereon or receive information therefrom. For example, in some implementations, the DOT circuitry 120 may interact with the memory 114 to send, retrieve, update, and/or store CAKs. For example, the DOT circuitry 120 may retrieve the CAK stored in the memory 114 and install the CAK in either a volatile memory or a non-volatile memory of the RoT associated with the device. As described herein, installing the CAK in the volatile or the non-volatile memory of the RoT results in no permanent modification to the device itself, unlike existing solutions that require CAK to be recorded in electrical fuses of the device or otherwise require permanent modification of the circuitry of the device.

In some embodiments, the system 102 includes hardware, software, firmware, and/or a combination of such components, configured to support various aspects of device ownership transfer. It should be appreciated that in some embodiments, the DOT circuitry 120 may perform one or more of such example actions in combination with another circuitry of the system 102, such as the memory 114, processor 112, input/output circuitry 116, and/or communications circuitry 118. For example, in some embodiments, the DOT circuitry 120 utilizes processing circuitry, such as the processor 112 and/or the like, to form a self-contained subsystem to perform one or more of its corresponding operations. In a further example, and in some embodiments, some or all of the functionality of the DOT circuitry 120 may be performed by processor 112. In this regard, some or all of the example processes and algorithms discussed herein can be performed by at least one of the processor 112 or the device ownership transfer (DOT) circuitry 120. It should also be appreciated that, in some embodiments, the device ownership transfer (DOT) circuitry 120 may include a separate processor, specially configured field programmable gate array (FPGA), or application specific interface circuit (ASIC) to perform its corresponding functions.

Accordingly, non-transitory computer readable storage media can be configured to store firmware, one or more application programs, and/or other software, which includes instructions and/or other computer-readable program code portions that can be executed to direct operation of the system 102 to implement various operations, including the examples shown herein. As such, a series of computer-readable program code portions may be embodied in one or more computer-program products and can be used, with the system 102, database, and/or other programmable apparatus, to produce the machine-implemented processes discussed herein. It is also noted that all or some of the information discussed herein can be based on data that is received, generated and/or maintained by one or more components of the system 102. In some embodiments, one or more external systems (such as a remote cloud computing and/or data storage system) may also be leveraged to provide at least some of the functionality discussed herein.

Example Methods for Implementing Non-Volatile
Device Ownership Transfer (DOT) of a Device FIG. 2 illustrates an example method 200 for implementing volatile Device Ownership Transfer (DOT) of a device, in accordance with an embodiment of the present disclosure. As shown in block 202, embodiments of the method include receiving a request from a first customer to record a mutable DOT of a device (e.g., device 106 shown in FIG. 1A) using a First Customer Authentication Key (FCAK). As described herein, the device may be a central processing unit (CPU) or a graphics processing unit (GPU) capable of processing large amounts of data and performing complex calculations at high speeds. By recording a mutable DOT on the device, the system may allow the first customer to take ownership of the device.

Next, as shown in block 204, embodiments of the method include receiving the FCAK from the first customer in response to receiving the request. In some embodiments, the FCAK may be a public key associated with the first customer, which, when installed in the device, allows the first customer to take ownership thereof.

Next, as shown in block 206, the method may include determining whether the device is capable of recording the mutable DOT. In some embodiments, in determining whether the device is capable of recording the mutable DOT, the system may determine whether the device includes an existing CAK installation. An existing CAK installation is often an indication that a different customer has claimed ownership of the device. If the ownership of the device is claimed by a different customer, the system may determine that the device is not capable of recording the mutable DOT. On the other hand, if the device does not include an existing CAK installation, the system may determine that the device is capable of recording the mutable DOT.

Next, as shown in block 208, the method may include installing, using the DOT circuitry, the FCAK in a non-volatile memory of a Root of Trust (RoT) associated with the device in an instance in which the device is capable of recording the mutable DOT. In some embodiments, installing the FCAK in the non-volatile memory of the RoT results in no permanent modification to the device. By installing the FCAK in the non-volatile memory of the RoT, the FCAK is preserved when the device is rebooted. In some embodiments, when installing the FCAK in the non-volatile memory of the RoT, the system may initially install the FCAK in a volatile memory of the RoT, then transfer the FCAK from the volatile memory of the RoT to the non-volatile memory of the RoT.

In some embodiments, in addition to installing the FCAK in the non-volatile memory, the system may lock the FCAK in the non-volatile memory to prevent any additional CAK installations. To this end, the system may mutably lock the FCAK in the non-volatile memory of the RoT using one or more encryption techniques to ensure that the FCAK is accessible only to authorized parties. In some embodiments, the one or more encryption techniques may include symmetric encryption, asymmetric encryption, hashing, digital signatures, and/or the like. In an example embodiment where asymmetric encryption is used to lock the FCAK in the non-volatile memory of the RoT, a public portion of the key may be used to lock the data. Here, the FCAK may be locked in the non-volatile memory of the RoT using a public portion of the First Lock Authentication Key (FLAK).

Having locked the FCAK in the non-volatile memory of the RoT, the first customer may now claim ownership of the device. Any subsequent software installation (e.g., firmware updates) associated with the device will now need to be signed, i.e., authorized, by the first customer prior to being installed thereon. Accordingly, in example embodiments, when a firmware update is to be installed on the device, the system may receive a firmware image associated with the firmware update. In response, the system may determine whether the firmware image is signed by the first customer. In this regard, the system may determine whether the firmware image is signed using a private portion of the FLAK, i.e., the private portion that corresponds to the public portion of the FLAK. Upon successful verification that the firmware image is signed using the private portion of the FLAK, the system may authorize the installation of the firmware update on the device.

To reduce the risk of compromise, and in some cases to maintain compliance, customers often engage in key rotation practice where a signing key (e.g., FCAK) is retired and replaced by a newly generated cryptographic key (e.g., second customer authentication key SCAK)). To achieve this, the first customer may be required to unlock the CAK that is currently installed in the device. To unlock the CAK, the first customer may be required to present the requisite authentication credentials (e.g., the private portion of the FLAK). In specific examples, a digital signature generated using the private portion of the FLAK may be used to unlock the FCAK. The digital signature may be used to authenticate ownership and/or possession of the private portion of the FLAK. Accordingly, the system may receive a first authenticated unlock request associated with the device to replace the FCAK with a SCAK. In some embodiments, the first authenticated unlock request may include the private portion of the FLAK. The system may retrieve the private portion of the FLAK from the first authenticated unlock request and subsequently unlock access to the FCAK installed in the non-volatile memory of the RoT associated with the device using the private portion of the FLAK.

Once unlocked, the first customer may retire the existing CAK by moving the CAK from the non-volatile memory to the volatile memory and may subsequently install the new CAK in the device. Accordingly, the system may transfer the FCAK from the non-volatile memory of the RoT associated with the device to the volatile memory of the RoT associated with the device. In some embodiments, once transferred to the volatile memory of the RoT, the FCAK may be automatically deleted upon a device reset (e.g., reboot). In some other embodiments, to delete the FCAK from the volatile memory of the RoT, the system may require an external input from the first customer. Accordingly, in response to transferring the FCAK to the volatile memory of the RoT, the system may receive an external input from the first customer to delete the FCAK from the volatile memory of the RoT. In response to receiving the external input, the system may subsequently delete the FCAK from the volatile memory of the RoT.

Having transferred the FCAK to the volatile memory, the system may then install, using the DOT circuitry, the SCAK in the non-volatile memory of the RoT associated with the device. Similar to the FCAK, the SCAK may be a public key associated with the first customer that is used for software signature authentication. In some embodiments, similar to installing the FCAK, the system may initially install the SCAK in the volatile memory of the RoT, then transfer the SCAK from the volatile memory of the RoT to the non-volatile memory of the RoT. Once installed, the system may lock the SCAK in the non-volatile memory to prevent any additional CAK installations using public key encryption.

Accordingly, the SCAK may be locked in the non-volatile memory of the RoT using the public portion of the FLAK.

In some cases, the first customer may wish to transfer ownership of the device to a second customer by retiring the FCAK installed in the non-volatile memory of the RoT and replacing it with a CAK owned by the second customer (e.g., Third Customer Authentication Key (TCAK)). Similar to the key rotation process, the first customer (or second customer) may be required to present the requisite authentication credentials (e.g., private portion of the FLAK) to unlock the FCAK. Accordingly, the system may receive a second authenticated unlock request associated with the device to transfer ownership of the device from the first customer to a second customer by replacing the FCAK with the TCAK. In some embodiments, the second authenticated unlock request may include the private portion of the FLAK. The system may retrieve the private portion of the FLAK from the second authenticated unlock request and subsequently unlock access to the FCAK installed in the non-volatile memory of the RoT associated with the device using the private portion of the FLAK.

Once unlocked, the second customer may install the new CAK (e.g., TCAK) in the non-volatile memory. Accordingly, the system may transfer the FCAK from the non-volatile memory of the RoT to the volatile memory of the RoT. Similar to the processing of the FCAK during key rotation, once transferred to the volatile memory of the RoT, the FCAK may either be automatically deleted upon a device reset (e.g., reboot) or upon request in the form of an external input from the second customer. Having transferred the FCAK to the volatile memory, the system may then install, using the DOT circuitry, the TCAK in the device, thereby transferring ownership of the device to the second customer. While the FCAK and SCAK may be public keys associated with the first customer, the TCAK may be a public key associated with the second customer that is used for software signature authentication. In some embodiments, similar to installing the SCAK, the system may initially install the TCAK in the volatile memory of the RoT, and then transfer the TCAK from the volatile memory of the RoT to the non-volatile memory of the RoT. Once installed, the system may lock the TCAK in the non-volatile memory to prevent any additional CAK installations using public key encryption. Accordingly, the TCAK may be locked in the non-volatile memory of the RoT using a public portion of the Second Lock Authentication Key (SLAK).

Having locked the SCAK in the non-volatile memory of the RoT, the second customer may now claim ownership of the device. Any subsequent software installation (e.g., firmware updates) associated with the device will now need to be signed, e.g., authorized, by the second customer prior to being installed thereon. Accordingly, when a firmware update is triggered on the device, the system may receive a firmware image associated with the firmware update. In response, the system may determine whether the firmware image is signed by the second customer. In this regard, the system may determine whether the firmware image is signed using a private portion of the SLAK. Upon successful verification that the firmware image is signed using the private portion of the SLAK, the system may authorize the installation of the firmware update on the device.

Example Methods for Implementing Volatile Device Ownership Transfer (DOT) of a Device FIG. 3 illustrates an example method for implementing volatile Device Ownership Transfer (DOT) of a device 300, in accordance with an embodiment of the present disclosure. As shown in block 302, embodiments of the method include receiving a request from a first customer to record a volatile DOT of a device using a First Customer Authentication Key (FCAK). Next, as shown in block 304, the method may include receiving the FCAK from the first customer in response to receiving the request. Next, as shown in block 306, the method may include installing, using the DOT circuitry, the FCAK in a volatile memory of a Root of Trust (RoT) associated with the device. In some embodiments, installing the FCAK in the volatile memory of the RoT results in no permanent modification to the device.

CAK installations in the volatile memory of the RoT, while mutable, are susceptible to deletion after each power cycle (e.g., when the device is rebooted). As the volatile memory is reset during a power cycle, the CAK must be streamed to the device after each power cycle to ensure the CAK is available for usage during device secure reboot or software update (e.g., firmware update). Accordingly, in such installations, care is taken to ensure that the device does not initiate a power cycle internally and may only reboot in response to an external stimulus that is authenticated by the first customer. Even when such an external stimulus is provided, the method may include determining whether the FCAK is installed in the volatile memory of the RoT associated with the device. Accordingly, when an authenticated external stimulus supplied, the method may include determining whether the FCAK is installed in the volatile memory of the RoT associated with the device. If no FCAK is installed, the method may include denying the device to securely reboot. On the other hand, if the FCAK has been installed, then the method may include triggering the device to securely reboot. Once the device securely reboots, the system may receive an indication that the device has been rebooted, resulting in a deletion of the FCAK in the volatile memory. In response, the system may automatically install, using the DOT circuitry, the FCAK in the volatile memory.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for implementing mutable device ownership transfer of a device, the system comprising:
   device ownership transfer circuitry; and
   a processor operatively coupled to the device ownership transfer circuitry, wherein the processor is configured to:
   receive a request from a first customer to record a mutable device ownership transfer of a device using a first customer authentication key;

receive the first customer authentication key from the first customer in response to receiving the request;

determine whether the device has an existing customer authentication key installation in a non-volatile memory of a Root of Trust (RoT) associated with the device; and install, using the device ownership transfer circuitry, the first customer authentication key in the non-volatile memory of the ROT associated with the device in an instance in which the device does not have the existing customer authentication key installation, wherein installing the first customer authentication key in the non-volatile memory of the Root of Trust (ROT) results in no permanent modification to the device.

2. The system of claim 1, wherein the processor is configured to:

initially install the first customer authentication key in a volatile memory of the ROT associated with the device in an instance in which the device does not have the existing customer authentication key installation;

transfer the first customer authentication key from the volatile memory of the RoT associated with the device to the non-volatile memory of the ROT associated with the device; and mutably lock the first customer authentication key using a first public lock authentication key in the non-volatile memory of the RoT associated with the device to prevent additional customer authentication key installation, wherein the first public lock authentication key is associated with the first customer.

3. The system of claim 2, wherein the processor is configured to:

receive a first authenticated unlock request associated with the device to replace the first customer authentication key with a second customer authentication key, wherein the second customer authentication key is associated with the first customer;

unlock the device in response to receiving the first authenticated unlock request;

transfer the first customer authentication key from the non-volatile memory of the RoT associated with the device to the volatile memory of the ROT associated with the device, thereby allowing for deletion of the first customer authentication key upon a subsequent device reset;

install, using the device ownership transfer circuitry, the second customer authentication key in the non-volatile memory of the ROT associated with the device; and mutably lock the second customer authentication key using the first public lock authentication key in the non-volatile memory of the ROT associated with the device to prevent additional customer authentication key installation.

4. The system of claim 3, wherein, in unlocking the device, the processor is configured to:

retrieve a first private lock authentication key from the first authenticated unlock request to unlock access to the first customer authentication key; and unlock, using the first private lock authentication key, access to the first customer authentication key installed in the non-volatile memory of the ROT associated with the device.

5. The system of claim 2, wherein the processor is configured to:

receive a second authenticated unlock request associated with the device to transfer ownership of the device from the first customer to a second customer by replacing the first customer authentication key with a third customer authentication key, wherein the third customer authentication key is associated with the second customer;

unlock the device in response to receiving the second authenticated unlock request;

transfer the first customer authentication key from the non-volatile memory of the RoT associated with the device to the volatile memory of the ROT associated with the device, thereby allowing for deletion of the first customer authentication key upon a subsequent device reset;

install, using the device ownership transfer circuitry, the third customer authentication key in the non-volatile memory of the ROT associated with the device, thereby transferring ownership of the device to the second customer, wherein installing the third customer authentication key in the non-volatile memory of the RoT results in no permanent modification to the device; and mutably lock the third customer authentication key using a second public lock authentication key in the non-volatile memory of the ROT associated with the device to prevent additional customer authentication key installation, wherein the second public lock authentication key is associated with the second customer.

6. The system of claim 1, wherein the first customer authentication key is a public key associated with the first customer that is used for firmware signature authentication.

7. The system of claim 1, wherein the processor is configured to:

trigger a firmware update on the device;

receive a firmware image associated with the firmware update;

authenticate the firmware image using the first customer authentication key installed in the non-volatile memory of ROT associated with the device; and authorize installation of the firmware update on the device in an instance in which the firmware image is authenticated.

8. The system of claim 1, wherein the first customer authentication key is preserved when the device is rebooted.

9. A method for implementing mutable device ownership transfer of a device, the method comprising:

receiving a request from a first customer to record a mutable device ownership transfer of a device using a first customer authentication key;

receiving the first customer authentication key from the first customer in response to receiving the request;

determining whether the device has an existing customer authentication key installation in a non-volatile memory of a Root of Trust (ROT) associated with the device; and installing, using the device ownership transfer circuitry, the first customer authentication key in the non-volatile memory of the ROT associated with the device in an instance in which the device does not have the existing customer authentication key installation, wherein installing the first customer authentication key in the non-volatile memory of the Root of Trust (ROT) results in no permanent modification to the device.

10. The method of claim 9, wherein the method further comprises:

initially installing the first customer authentication key in a volatile memory of the RoT associated with the device in an instance in which the device does not have the existing customer authentication key installation;

transferring the first customer authentication key from the volatile memory of the RoT associated with the device to the non-volatile memory of the ROT associated with the device; and mutably locking the first customer authentication key using a first public lock authentication key in the non-volatile memory of the ROT associated with the device to prevent additional customer authentication key installation, wherein the first public lock authentication key is associated with the first customer.

11. The method of claim 10, wherein the method further comprises:

receiving a first authenticated unlock request associated with the device to replace the first customer authentication key with a second customer authentication key, wherein the second customer authentication key is associated with the first customer;

unlocking the device in response to receiving the first authenticated unlock request;

transferring the first customer authentication key from the non-volatile memory of the RoT associated with the device to the volatile memory of the ROT associated with the device, thereby allowing for deletion of the first customer authentication key upon a subsequent device reset;

installing, using the device ownership transfer circuitry, the second customer authentication key in the non-volatile memory of the ROT associated with the device; and mutably locking the second customer authentication key using the first public lock authentication key in the non-volatile memory of the ROT associated with the device to prevent additional customer authentication key installation.

12. The method of claim 11, wherein, in unlocking the device, the method further comprises:

retrieving a first private lock authentication key from the first authenticated unlock request to unlock access to the first customer authentication key; and unlocking, using the first private lock authentication key, access to the first customer authentication key installed in the non-volatile memory of the ROT associated with the device.

13. The method of claim 10, wherein the method further comprises:

receiving a second authenticated unlock request associated with the device to transfer ownership of the device from the first customer to a second customer by replacing the first customer authentication key with a third customer authentication key, wherein the third customer authentication key is associated with the second customer;

unlocking the device in response to receiving the second authenticated unlock request;

transferring the first customer authentication key from the non-volatile memory of the RoT associated with the device to the volatile memory of the ROT associated with the device, thereby allowing for deletion of the first customer authentication key upon a subsequent device reset;

installing, using the device ownership transfer circuitry, the third customer authentication key in the non-volatile memory of the ROT associated with the device, thereby transferring ownership of the device to the second customer, wherein installing the third customer authentication key in the non-volatile memory of the RoT results in no permanent modification to the device; and mutably locking the third customer authentication key using a second public lock authentication key in the non-volatile memory of the ROT associated with the device to prevent additional customer authentication key installation, wherein the second public lock authentication key is associated with the second customer.

14. The method of claim 9, wherein the first customer authentication key is a public key associated with the first customer that is used for firmware signature authentication.

15. The method of claim 9, wherein the method further comprises:

triggering a firmware update on the device;

receiving a firmware image associated with the firmware update;

authenticating the firmware image using the first customer authentication key installed in the non-volatile memory of ROT associated with the device; and authorizing installation of the firmware update on the device in an instance in which the firmware image is authenticated.

16. The method of claim 9, wherein the first customer authentication key is preserved when the device is rebooted.

* * * * *